United States Patent
Xiong et al.

(10) Patent No.: US 11,164,095 B2
(45) Date of Patent: Nov. 2, 2021

(54) FUZZY CURVE ANALYSIS BASED SOFT SENSOR MODELING METHOD USING TIME DIFFERENCE GAUSSIAN PROCESS REGRESSION

(71) Applicant: Jiangnan University, Wuxi (CN)

(72) Inventors: Weili Xiong, Wuxi (CN); Yanjun Li, Wuxi (CN); Mingchen Xue, Wuxi (CN)

(73) Assignee: Jiangnan University, Wuxi (CN)

( * ) Notice: Subject to any disclaimer, the term of this patent is extended or adjusted under 35 U.S.C. 154(b) by 0 days.

(21) Appl. No.: 16/710,710

(22) Filed: Dec. 11, 2019

(65) Prior Publication Data
US 2020/0118015 A1    Apr. 16, 2020

Related U.S. Application Data

(62) Division of application No. 15/174,389, filed on Jun. 6, 2016, now abandoned.

(30) Foreign Application Priority Data

Aug. 28, 2015   (CN) .......................... 201510541727.5

(51) Int. Cl.
G06N 5/04        (2006.01)
(52) U.S. Cl.
CPC .......... G06N 5/048 (2013.01); *F23N 2223/52* (2020.01)
(58) Field of Classification Search
CPC .......................... F23N 2223/52; G06N 5/048
(Continued)

(56) References Cited

U.S. PATENT DOCUMENTS

2005/0149549 A1*  7/2005  Jaspers ................ G06F 16/958
2007/0250292 A1* 10/2007  Alagappan .............. C10B 55/00
                                                                   702/184
(Continued)

OTHER PUBLICATIONS

Yuan, Xiaofeng, Zhiqiang Ge, and Zhihuan Song. "Locally weighted kernel principal component regression model for soft sensing of nonlinear time-variant processes." Industrial & Engineering Chemistry Research 53, No. 35 (2014): 13736-13749. (Year: 2014).*

(Continued)

*Primary Examiner* — Luis A Sitiriche
*Assistant Examiner* — Oluwatosin O Alabi
(74) *Attorney, Agent, or Firm* — IPro, PLLC; Na Xu

(57) ABSTRACT

The invention provides a fuzzy curve analysis based soft sensor modeling method using time difference Gaussian process regression, it is suitable for application in chemical process with time delay characteristics. This method can extract stable delay information from the historical database of process and introduce more relevant modeling data sequence to the dominant variable sequence. First of all, the method of fuzzy curve analysis (FCA) can intuitively judge the importance of the input sequence to the output sequence, estimate the time-delay parameters of process, and such offline time-delay parameter set can be utilized to restructure the modeling data. For the new input data, based on the historical variable value before a certain time, the current dominant value can be predicted by time difference Gaussian Process Regression (TDGPR) model. This method does not encounter the problem of model updating and can effectively track the drift between input and output data. Compared with steady-state modeling methods, this invention can achieve more accurate predictions of the key variable, thus improving product quality and reducing production costs.

3 Claims, 9 Drawing Sheets

(58) Field of Classification Search
USPC .......................................................... 706/51
See application file for complete search history.

(56) References Cited

U.S. PATENT DOCUMENTS

2008/0033900 A1* 2/2008 Zhang .................... G06N 5/048
706/52
2008/0133433 A1* 6/2008 Khanbaghi ............ G06N 7/023
706/4
2018/0129873 A1* 5/2018 Alghazzawi ....... G06K 9/00335

OTHER PUBLICATIONS

Chen, B., & Liu, X. (2004). Reliable control design of fuzzy dynamic systems with time-varying delay. Fuzzy sets and systems, 146(3), 349-374. (Year: 2004).*
Kaneko, H., & Funatsu, K. (2011). Maintenance-free soft sensor models with time difference of process variables. Chemometrics and Intelligent Laboratory Systems, 107(2), 312-317. (Year: 2011).*
Hongmei, R., Xuemin, T., & Lianfang, C. (May 2015). A new soft sensor method for dynamic processes based on dynamic orthogonal forward regression. In the 27th Chinese Control and Decision Conference (2015 CCDC) (pp. 536-541). IEEE. (Year: 2015).*
Lin, Y., & Cunningham, G. A. (1995). A new approach to fuzzy-neural system modeling. IEEE Transactions on Fuzzy systems, 3(2), 190-198. (Year: 1995).*
Mohaghegh, S., Mohamad, K., Andrei, P., Sam, A., & Wood, D. (2001). Performance drivers in restimulation of gas-storage wells. SPE Reservoir Evaluation & Engineering, 4(06), 536-542. (Year: 2001).*

* cited by examiner (e) $x_5(t)$ and $x_5(t-14)$ (f) $x_6(t)$ and $x_6(t-19)$ (a) $x_1(t)$ and $x_1(t-14)$ (b) $x_2(t)$ and $x_2(t-16)$ (c) $x_3(t)$ and $x_3(t-10)$ (d) $x_4(t)$ and $x_4(t-17)$

FUZZY CURVE ANALYSIS BASED SOFT SENSOR MODELING METHOD USING TIME DIFFERENCE GAUSSIAN PROCESS REGRESSION

CROSS-REFERENCES AND RELATED APPLICATIONS

This application is a divisional application of U.S. application Ser. No. 15/174,389 filed on Jun. 6, 2016, that claims the benefit of priority to Chinese Application No. 201510541727.5, entitled "A fuzzy curve analysis based soft sensor modeling method using time difference Gaussian process regression", filed on Aug. 28, 2015, which is herein incorporated by reference in its entirety.

BACKGROUND OF THE INVENTION

Field of the Invention

The invention relates to a fuzzy curve analysis based time difference Gaussian process regression soft sensor modeling method (FCA-TDGPR), and belongs to the field of complex industrial process modeling and soft sensing.

Description of the Related Art

The traditional soft sensor modeling methods mostly consider the characteristics of zero delay, that is, considering the input and output with the same sampling interval and input variable collected at time t corresponds to the t-th dominant variable sample in the database. However, there is a significant time lag between the input data collected by each sensor and the output data obtained through the laboratory analysis or online instrumentation. If we continue using steady-state modeling approaches, the established model will be unable to fully explain the characteristics of the process, and it does not meet the causality of actual process. In order to ensure that the soft sensor model can achieve accurate predictions of the key variables in a long time, it is necessary to take measures to introduce the time delay and dynamic information.

Essentially speaking, most of the existing time delay estimation methods are trying to find the auxiliary variables which are most closely related to the dominant variables for modeling. When applying such methods to practical applications, it is needed to get a tradeoff between the complexity and the accuracy of the algorithm. In view of the process time delay estimation problem, at present, the existing methods include mutual information (MI) method, correlation coefficient method, etc. The invention adopts fuzzy curve analysis method to introduce variable time delay information into the soft sensor model, and the characteristic of this method is low computational complexity while being easy to understand. It is possible to visually and effectively determine the importance degree of the input variables.

The performance of soft sensor model needs to be maintained by periodic reconstruction in order to dynamically track and effectively take control of the process. The main methods include Moving Window (MW), iterative approach and Just-in-time Learning (JITL), but these methods often need to update the model frequently. Time difference model not only can deal with the problem of model performance degradation due to time lapse and achieve the effect of tracking process dynamics exactly as model updating, it also is able to minimize the likelihood of model reconstruction.

Up to now, data-driven based soft sensor modeling methods have received more and more attention. Some commonly used methods like partial least squares (PLS) and principal component analysis (PCA). They can describe well the linear relationship between input variables and output variables. And artificial neural networks (ANN), support vector machine (SVM) and least squares support vector machine (LS-SVM) can effectively deal with the nonlinear characteristics of the process. In recent years, as a nonparametric probabilistic model, GPR not only can give the predictive value, but also can get the uncertain degree of predictive value. Therefore, the GPR model is selected as the basic soft sensor modeling algorithm in the present invention, and combined with the TD modeling strategy to effectively deal with the drift between input and output data in the process.

In summary, considering the establishment of a time delay online soft sensor model for the strict control of key variables in the process is of great significance.

DETAILED DESCRIPTION

For time delay process, the soft sensor model without delay can't be modeled by the sequence of auxiliary variables which are the most relevant to the dominant variable. When such a model is employed to do estimation, the estimation accuracy of the dominant variable will be greatly affected. In order to effectively extract the process delay information and set up an online soft sensor model without the case of frequent model updating, it is necessary to provide a more effective online strategy for the prediction of key variable. Therefore, this invention provides a soft sensor modeling method based on FCA-TDGPR.

The invention is realized by the following technical scheme:

Soft sensor modeling method based on FCA-TDGPR which comprises the following steps: aiming at the time delay process, first of all, collect enough samples of data and constitute the historical database with the historical values of auxiliary variables and dominant variable.

The FCA method is used to determine the time delay parameters of each auxiliary variable with respect to the dominant variable sequence, which is used to reconstruct the soft sensor modeling data;

Then, When new input samples are available, a time difference Gaussian process regression (TDGPR) model is employed for current time online prediction based on historical variable values collected certain moments ago, thus making it possible to realize real-time estimation and control of the key variable, obtain more accurate results, increase the yield and reduce production costs.

EXAMPLES

Figure 1:
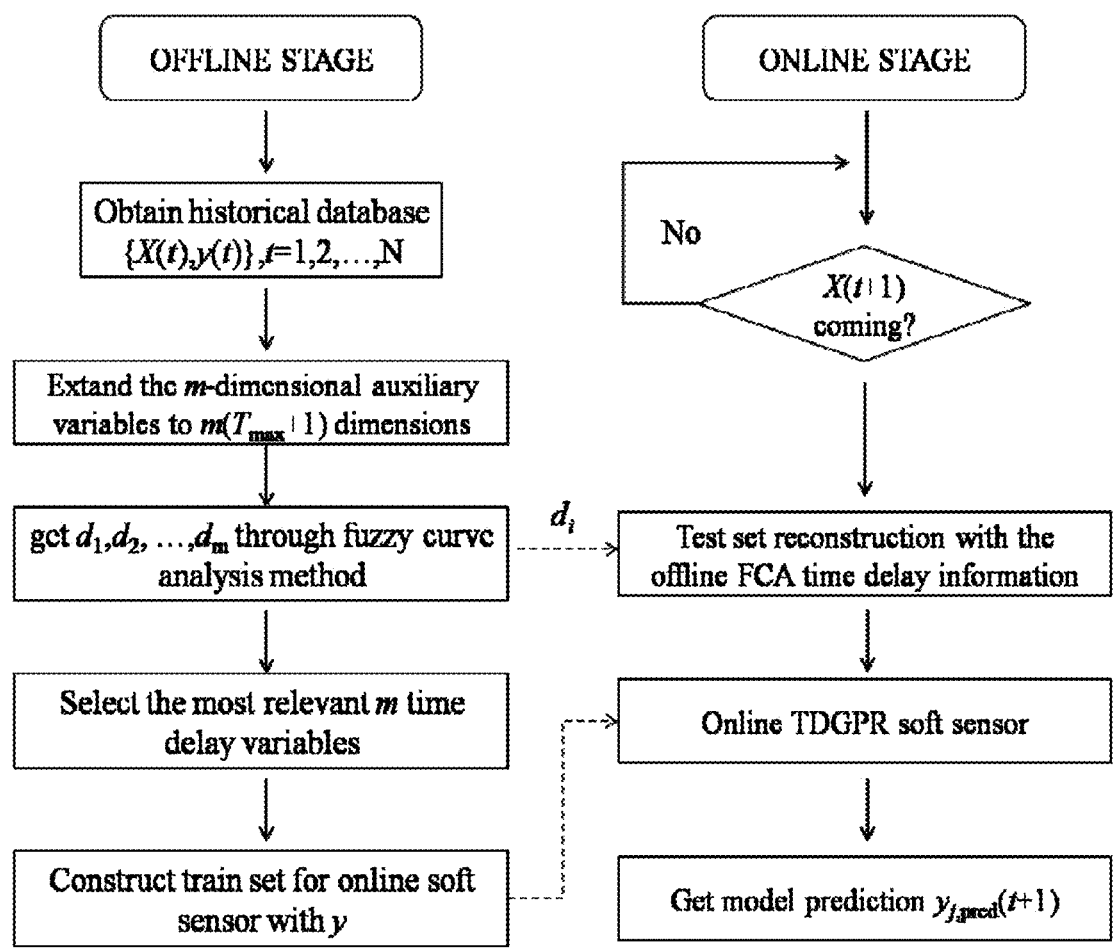
FIG. 1 is a flow chart of online soft sensor method based on FCA-TDGPR.
Figure 2:
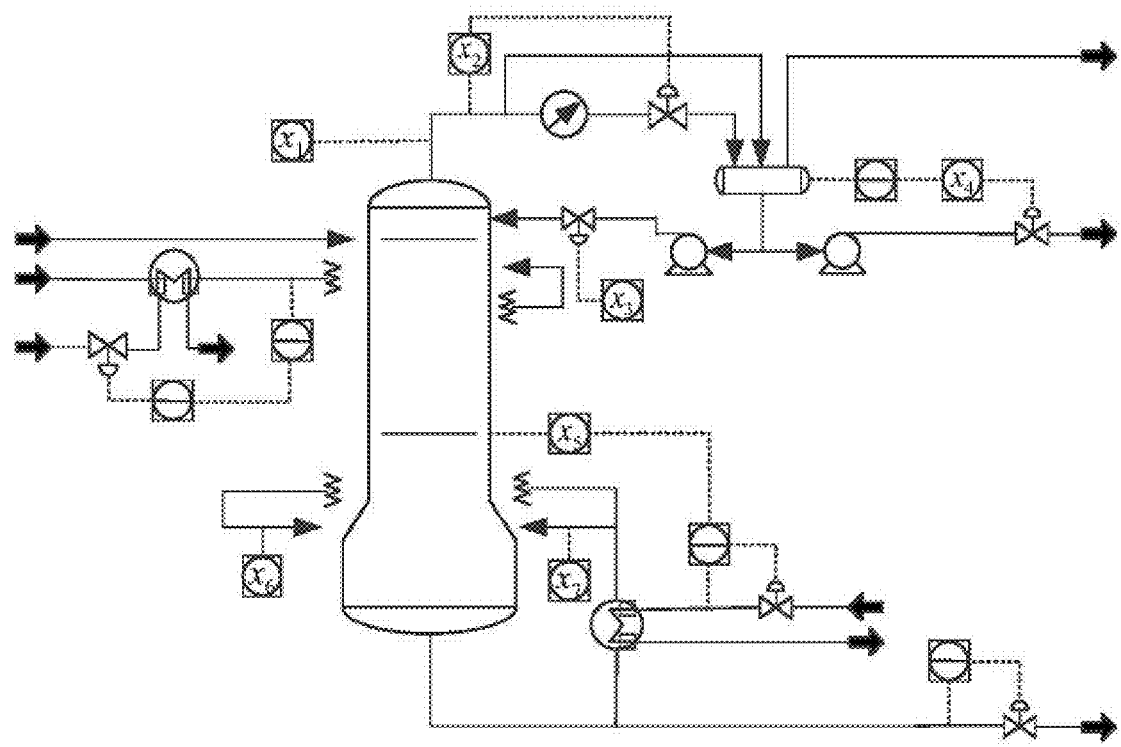
FIG. 2 is a schematic diagram of debutanizer process.

The modeling flow chart, which is shown in FIG. 1 below, is further detailed in the present invention:

Take the actual chemical process as an example, debutanizer is an important part of naphtha desulfurization and separation device of oil refining production process, and one of the dominant variables needed to be controlled for this process is the concentration of the bottom butane (C4). The schematic diagram of the process is shown in FIG. 2, due to the value of C4 cannot be directly measured, therefore, there is a delay issue in analyzing and obtaining C4 concentration values. At the same time, different auxiliary variables show different degrees of time delay. Experimental data is derived from the actual industrial process which contains 2394 samples, a total of 7 auxiliary variables. As shown in FIG. 2, $x_1$ is the top temperature; $x_2$ is the top pressure; $x_3$ is the reflux flow; $x_4$ is the top product outflow; $x_5$ is the 6th tray temperature; $x_6$ is the bottom temperature 1; $x_7$ is the bottom temperature 2. The 1 dominant variable is the bottom butane concentration, which in this invention is predicted as the key variable of the process.

Step1: Collect historical input and output data to form a training database which contains N continuous samples. Assuming that the data is expressed as $\{X(t),y(t)\}, t=1, 2, \ldots, N$ and is preprocessed, and the 2 bottom temperature variables are averaged as 1 auxiliary variable, then, $X(t)=[x_1(t),x_2(t),x_3(t),x_4(t),x_5(t),x_6(t)]^T$. The maximum time delay $T_{max}$ of 6 variables is set to 19.

Step2: For each of the original variables $x_i$, $i \in \{1, 2, \ldots, 6\}$, they are extended to the input variables with time delay $\{x_i(t-\lambda), \lambda=0, 1, \ldots, T_{max}\}$ by formula (1), and a set of 120 dimensional delay variables will be obtained for subsequent analysis $$x_i(t), x_i(t-1), \ldots x_i(t-d_i), \ldots, x_i(t-T_{max}) \quad (1)$$

$$i = 1, 2, \ldots, m \quad m \text{ sets}$$

Step3: Determine the importance of each variable in the time delay input variable set by FCA, for $(x_i(t),y(t))$, fuzzy membership function of variable $x_i$ is defined as:

$$\Phi_{it}(x_i) = \exp\left[-\left(\frac{x_i(t) - x_i}{b}\right)^2\right] \quad (2)$$

For each $x_i$, $\{\Phi_{it}, y(t)\}$ provides a fuzzy rule which is described as $\{if\ x_i\ is\ \Phi_{it}(x), then\ y\ is\ y(t)\}$, and $\Phi_{it}$ is a fuzzy membership function of input variable $x_i$ at t-th data point; In formula (2) a Gaussian fuzzy membership function is selected; b is determined as 20% the range of variable $x_i$. As a result, For N training samples, each sample corresponding to each variable has N fuzzy rules. In the fuzzy membership function, $\Phi_{it}=1$ holds true at each point $\{x_i(t), y(t)\}$.

For time delay process, by introducing time delay information the original variable $x_i$ becomes $(T_{max}+1)$-dimensional, which can be expressed as $x_i(t-\lambda), \lambda=0, 1, \ldots, T_{max}$, $\lambda$ is a variable delay value to be introduced; fuzzy curve $C_{i,\lambda}$ with the condition that $\lambda$ is the i-th variable delay value can be obtained by making centroid defuzzification of each new expanded variable using formula (3); as shown in the formula (4), $d_i$ is the $\lambda$ which can make the maximum coverage of fuzzy curve $C_{i,\lambda}$; $C_{i,\lambda}(\lambda)_{max}$ is the maximum value of the fuzzy curve point range, while $C_{i,\lambda}(\lambda)_{min}$ is the minimum value of the fuzzy curve point range;

$$C_{i,\lambda}(\lambda) = \frac{\sum_{t=1}^{N} \Phi_{it}[x_i(t-\lambda)] \cdot y(t)}{\sum_{t=1}^{N} \Phi_{it}[x_i(t-\lambda)]} \quad (3)$$

$$d_i = \underset{\lambda}{\operatorname{argmax}}[C_{i,\lambda}(\lambda)_{max} - C_{i,\lambda}(\lambda)_{min}] \quad (4)$$

If the scope of the $C_{i,\lambda}(\lambda)$ range is closer to that of y, then the input variable $x_i(t-\lambda)$ is more important. In view of this point, the importance degree of each variable can be determined by sorting the coverage of $C_{i,\lambda}(\lambda)$. Finally, the optimal delay parameter $d_i$ as well as time delay variable $x_i(t-d_i)$ can thus be obtained by FCA method, which later on can be used for soft sensor modeling data reconstruction.

Step4: Based on the previous step, the time delay parameters $d_1, d_2, \ldots, d_m$ are used to reconstruct the training input sample set for on-line modeling, the reconstructed input dataset is denoted as $X_d(t)$, $X_d(t)=[x_1(t-d_1),x_2(t-d_2),x_3(t-d_3),x_4(t-d_4),x_5(t-d_5),x_6(t-d_6)]$. If there is a new input sample $X(t+1)$, then the delay input set could be restructured based on historical database samples with the same parameters, then go to step 5, otherwise, wait for the arrival of new data.

Step 5: After the reorganization procedure, the training set and the new data are processed by j order time difference treatment (the value of j can be determined according to the sampling period and property of dominant variable):

$$\Delta X_{d,j}(t)=X_d(t)-X_d(t-j)$$

$$\Delta y_j(t)=y(t)-y(t-j) \quad (5)$$

Next, make a regression of the relationship between $\Delta X_{d,j}(t)$ and $\Delta y_j(t)$ by GPR, which satisfies $\Delta(t)=f(\Delta X(t))+e(t)$. The GPR method can obtain the mapping relationship through the given training input and output samples. In this way, the corresponding predictive value and the uncertainty degree can be obtained given the new input data, which means the result will be probabilistic. The GPR algorithm is shown as below.

In general, the relationship between the observed output value y and noise $\varepsilon$ satisfies:

$$y_i=f(x_i)+\varepsilon$$

$$\varepsilon \sim N(0,\sigma_n^2) \quad (6)$$

If the mean function and covariance function are determined, then the distribution of the Gaussian process is well-determined. For simplicity, the mean function is usually preprocessed into 0. Covariance function can transform the correlation of output data into the function of input data. As similar inputs produce similar outputs, the covariance function can be selected according to the characteristics of the sample distribution. One condition which must be satisfied is that the closer the distance of samples is, the more correlated the two samples are, and vise versa. The covariance function form of this invention is shown in formula (7):

$$k(x_p, x_q) = v \exp\left[-\frac{1}{2}\sum_{d=1}^{D} \pi_d(x_p^d - x_q^d)^2\right] \quad (7)$$

In the formula, $x_p, x_q \in R^D$, v controls the magnitude of the covariance function. $\pi^d$ describes the relative importance of each input attribute $x^d$. The determination of the hyperparameter $\Theta_{gp}=(v, \pi_1, \ldots, \pi_D, \sigma_n^2)$ in the Gaussian process is generally estimated by the MLE method. The optimization of the parameters can be realized by using the conjugate gradient method. Based on test sample and training data, the posterior distribution of test data x* can be calculated, and its predictive value obey the joint Gaussian distribution described in formula (9), where K(X,X) is n-dimensional covariance matrix of training samples; k(x*,X) is the covariance vector of test sample and training samples; k(x*,x*) is the autocovariance of test sample, and $f_{gp}$ is a predictive value of GPR.

$$L(\Theta_{gp}) = \tag{8}$$
$$-\frac{1}{2}y^T[K(X,X)+\sigma_n^2 I]^{-1}y - \frac{1}{2}\text{logdet}[K(X,X)+\sigma_n^2 I] - \frac{n}{2}\log 2\pi$$

$$f_{gp} \mid X, y, x_* \sim N(\overline{f_{gp}}, \text{cov}(f_{gp})) \tag{9}$$
$$\text{s.t. } \overline{f_{gp}} = k(x_*, X)[K(X,X)+\sigma_n^2 I_n]^{-1}y$$
$$\text{cov}(f_{gp}) = k(x_*, x_*) - k(X, x_*)^T[K(X,X)+\sigma_n^2 I_n]^{-1} \cdot k(X, x_*)$$

when the new input data arrives at time t+1, the calculating formula of predictive value $y_{j,pred}(t+1)$ with TDGPR method is:

$$\Delta X_j(t+1)=X(t+1)-X(t+1-j)$$

$$\Delta y_{j,pred}(t+1)=f_{GPR}(\Delta X_j(t+1))$$

$$y_{j,pred}(t+1)=y_j(t+1-j)+\Delta y_{j,pred}(t+1) \tag{10}$$

Figure 3:
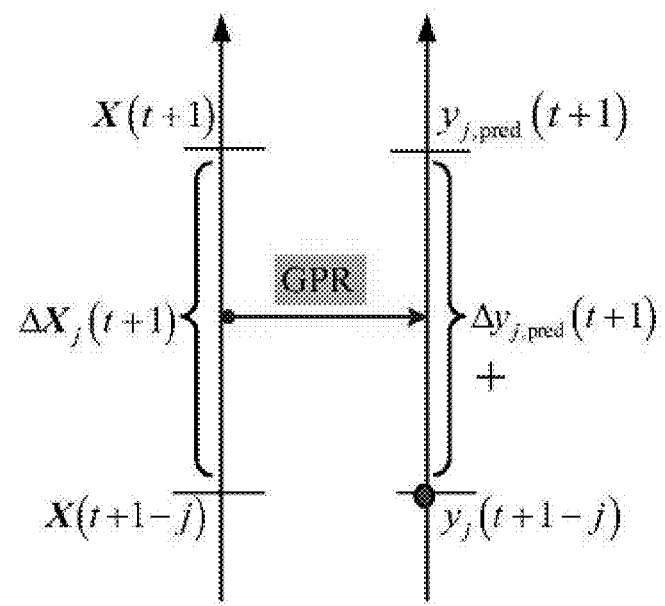
FIG. 3 is a schematic diagram of TDGPR modeling approach.

In the actual industrial process, there will be the case of instrument damage or laboratory analysis with delay, and the circumstance that the time interval of obtaining dominant variable is large and the quantity is small or there is a lack of dominant analysis value in the database. Thus, shown in FIG. 3, for new incoming test data X(t+1), based on $y_j(t+1-j)$ stored in the database j moment ago, the predictive value of the dominant variable at time t+1 can be obtained. The predicted output $y_{j,pred}(t+1)$ of the online model is calculated by formula (10), and the predicted result of bottom butane concentration can be obtained.

Figure 4:
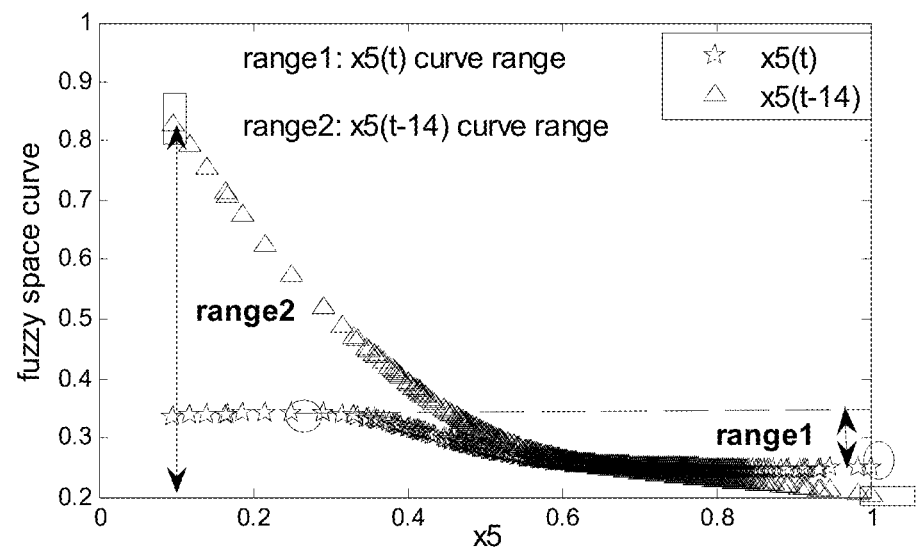
FIG. 4 contains fuzzy curve distribution diagrams of the original variables and optimal time delay variables.
Figure 4:
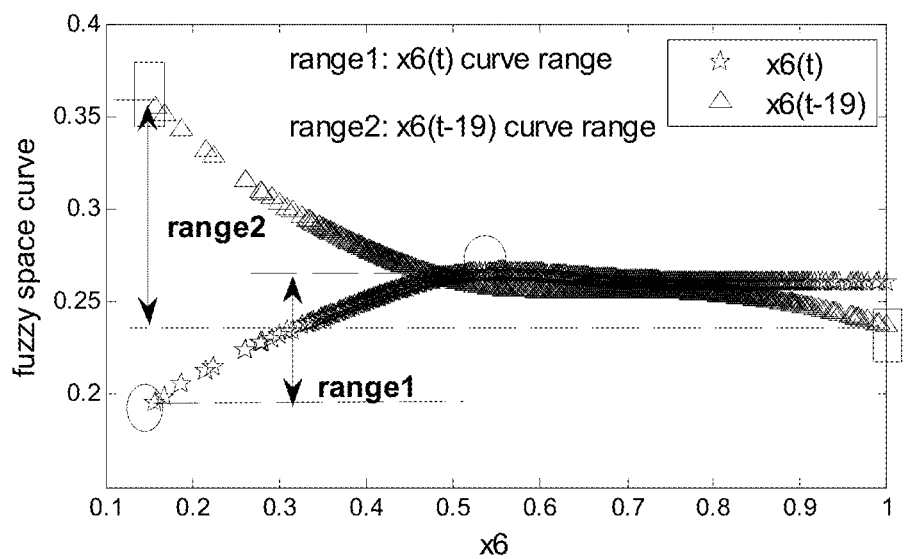
Figure 4:
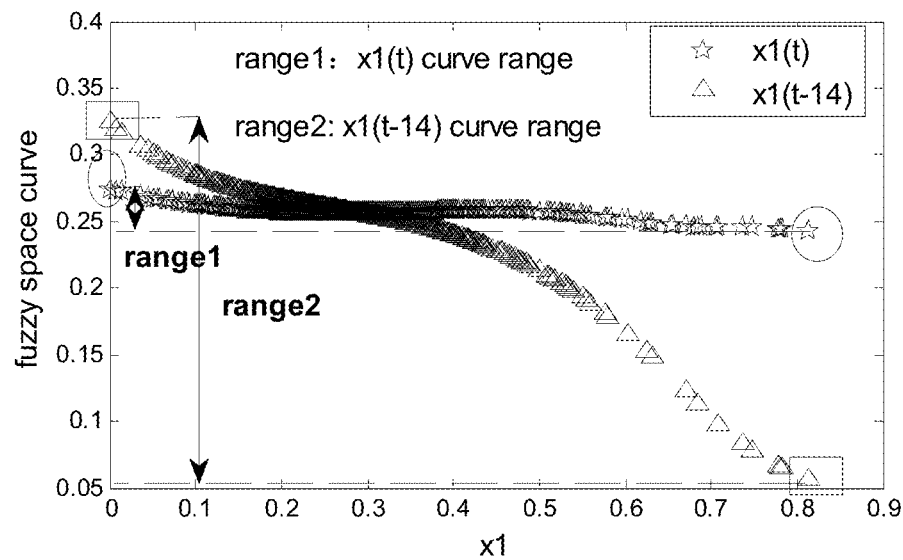
Figure 4:
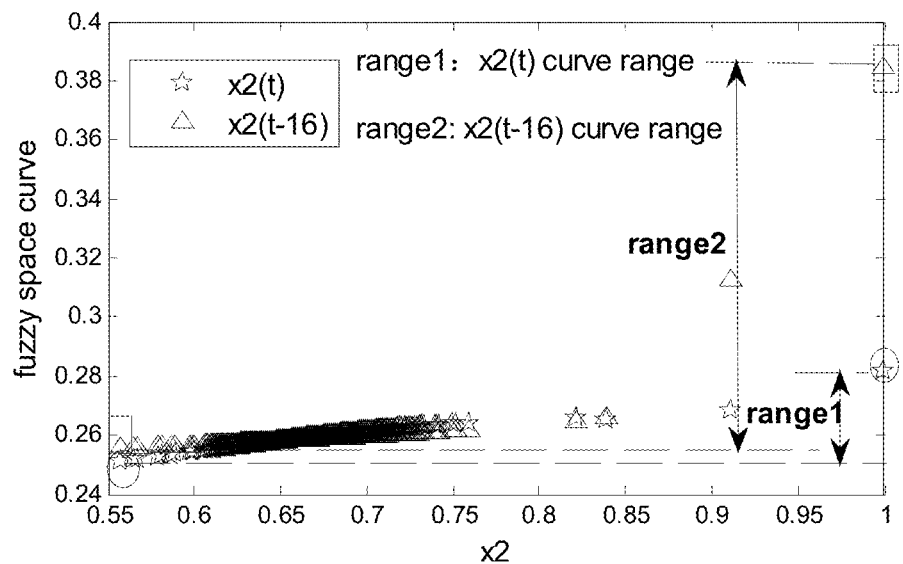
Figure 4:
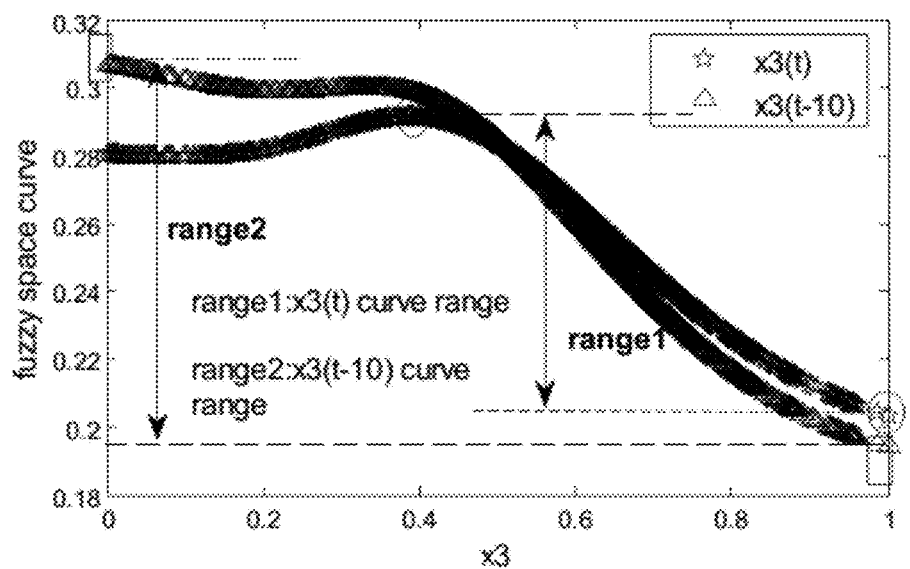
Figure 4:
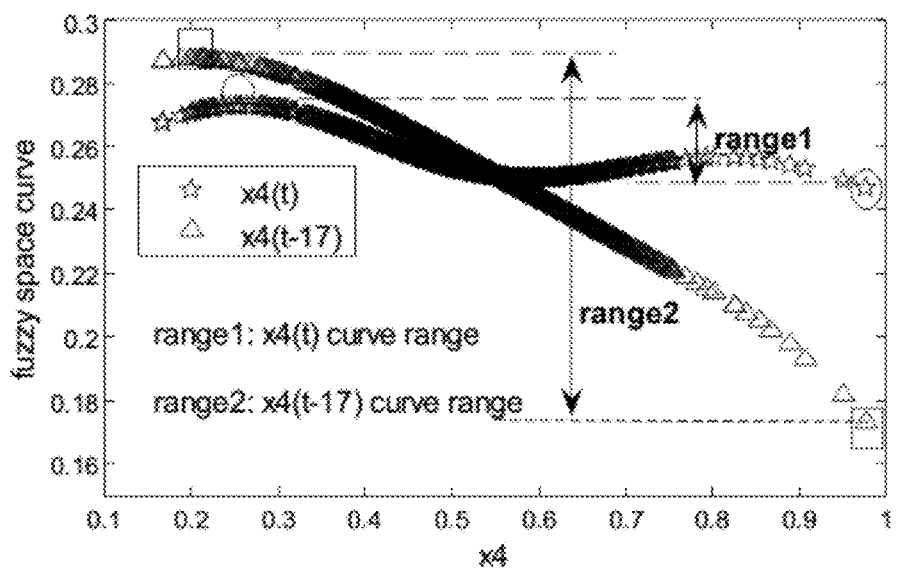

As shown in FIG. 4, compared the original variables without time delay, 6 reconstructed variables contribute more to the dominant variable, which introduce more relevant modeling data for online modeling. At the same time, in order to verify the effectiveness of this invention for on-line estimation, the first 1519 samples are selected in 2394 samples to reconstruct 1500 training samples. The final 875 samples are then used as test samples, and a soft sensor is established for on-line prediction of butane concentration.

Figure 5:
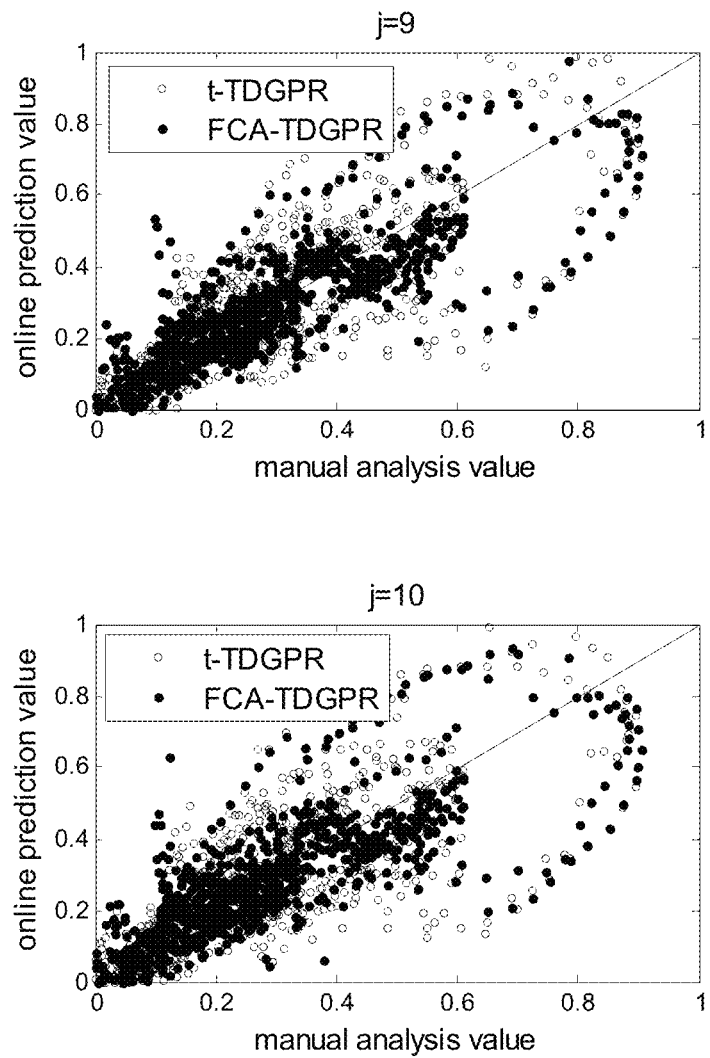
FIG. 5 contains scatterplots of butane concentration predictions with different j values.
Figure 5:
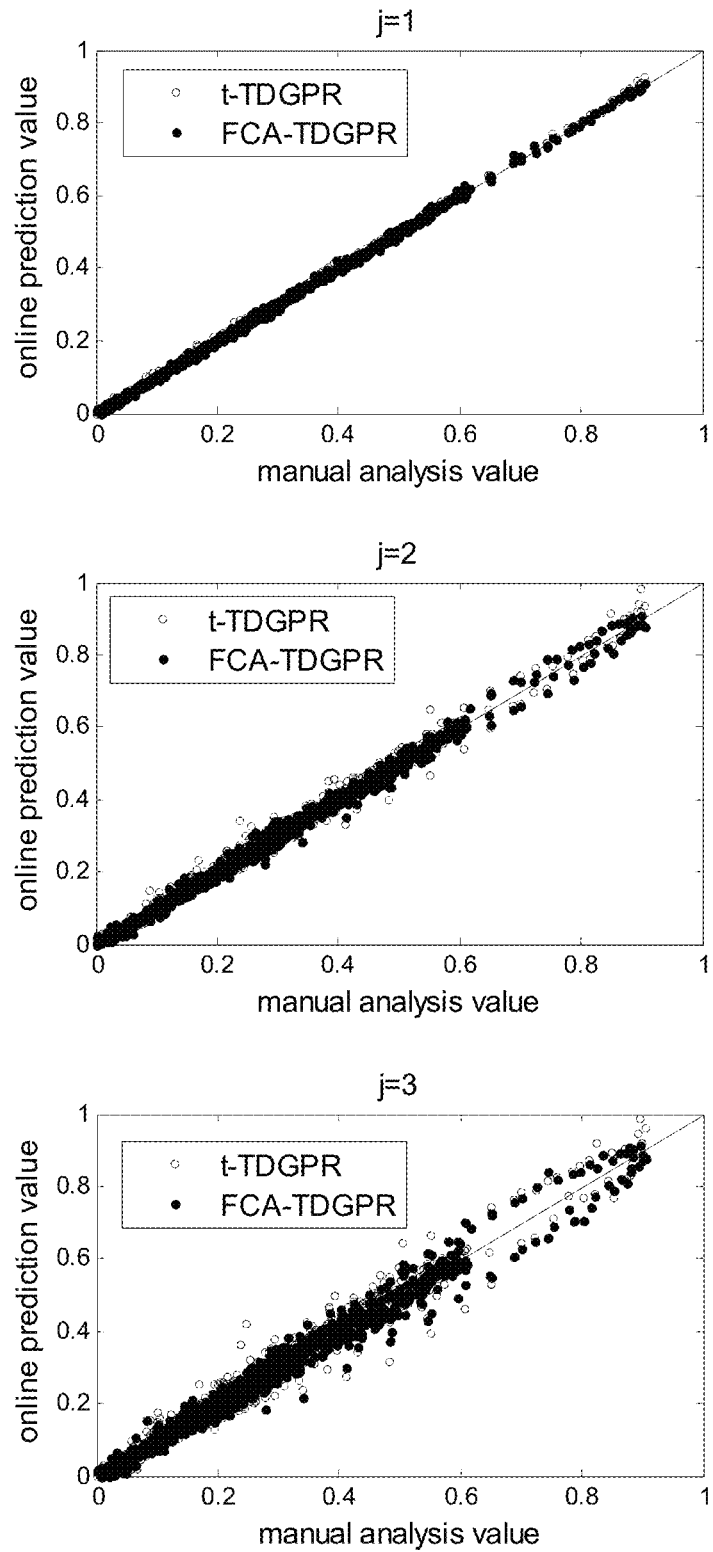
Figure 5:
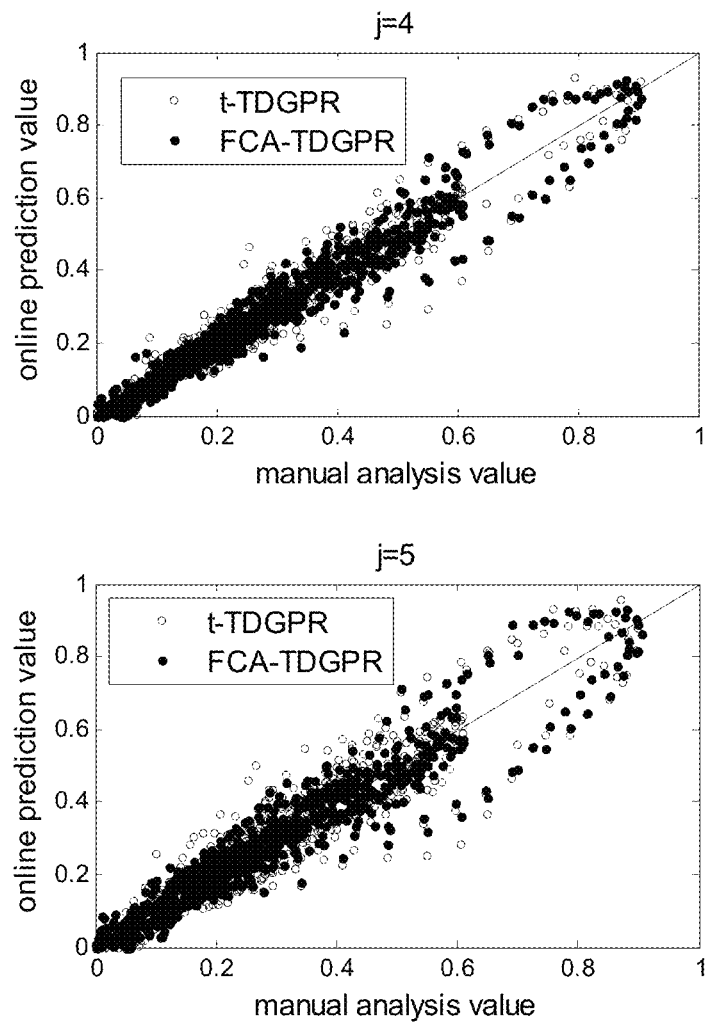
Figure 5:
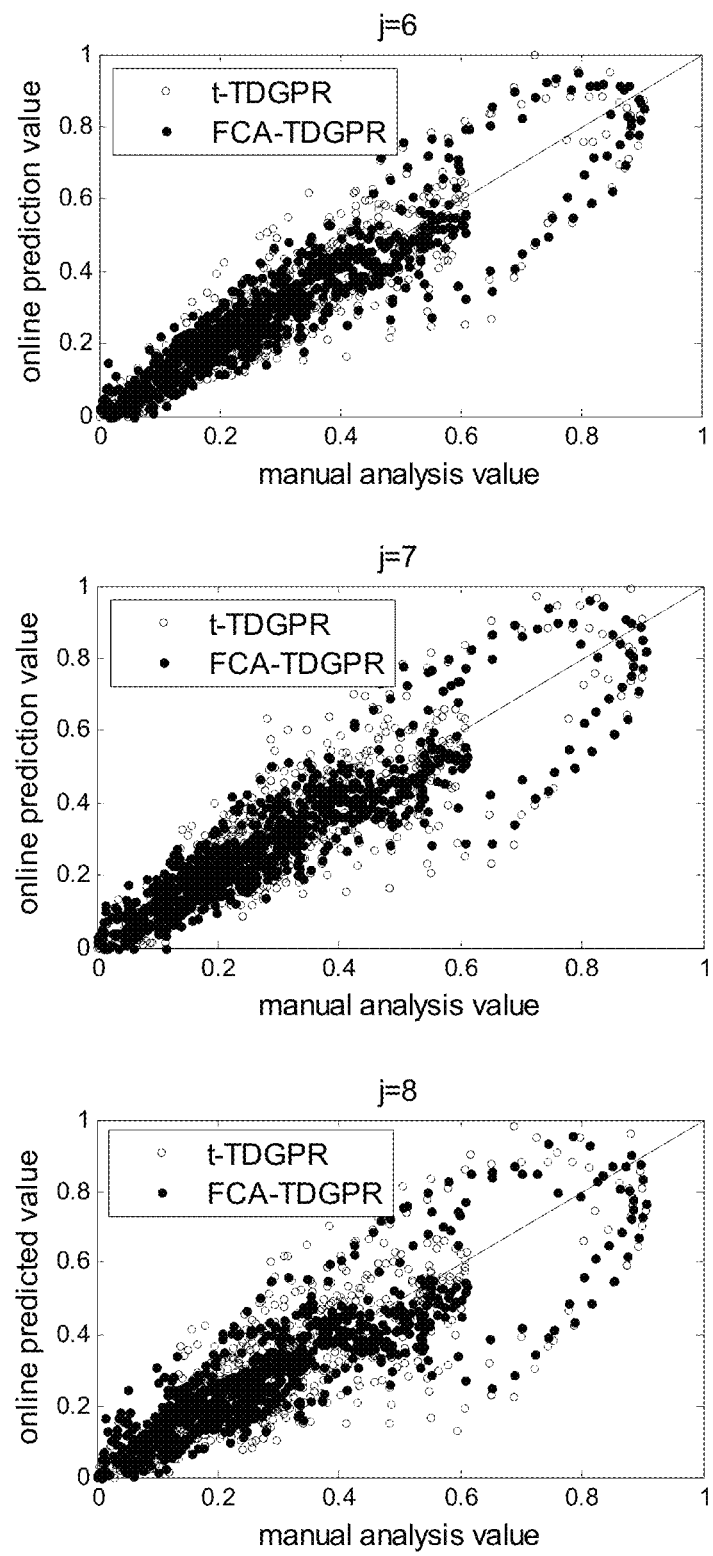

FIG. 5 contains scatterplots of butane concentration prediction results with two methods respectively denoted as the FCA-TDGPR method (present method) which involves delay estimation, and t-TDGPR method which is without time delay estimation.

From FIG. 5, when the time difference order j increases from 1 to 10, the time interval of prediction based on historical database is gradually increasing, and the prediction accuracy is declining. This is because the more recent the analysis value is, the better tracking ability the model has for current process dynamics.

Although the accuracy of the two methods are in decline, compared with the TDGPR method without considering the time delay, the predicted results of the present invention can be better close to the true value of the butane concentration when the time difference increases. This suggests that extracted delay information is in line with the actual causal relationship of the process, and the soft sensor model with variable time delay estimation is more accurate.

After fuzzy curve analysis method is taken to determine the optimal parameters, reconstructed data is proved to be capable of enhancing the accuracy of online model significantly by introducing more contributing auxiliary variables to dominant variable sequence. At the same time, it reflects that the GPR method can explain the dynamic change of the process well. The online soft sensor model based on TDGPR method can adaptively estimate real-time butane concentration with historical variables collected j time ago.

FIGS. 4 and 5 have jointly validated that fuzzy curve analysis based time difference Gaussian process regression soft sensor modeling method has good accuracy for on-line prediction of bottom butane concentration.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A method comprising:
   collecting values of a plurality of first variables of a reaction vessel, as functions of time;
   collecting values of a second variable of the reaction vessel as a function time;
   generating a plurality of new expanded variables for each variable in the plurality of first variables by introducing time delay information based on the collected values of the plurality of first variables;
   determining a variable time delay value of the first variables by making centroid defuzzification of each new expanded variable using fuzzy curve analysis (FCA) based on the values of the second variable;
   establishing a Gaussian process model based on the values of the first variables delayed by their respective variable time delay values and the values of the second variable;
   determining a prediction of the second variable by a time difference Gaussian process regression (TDGPR) using the Gaussian process model;
   controlling the reaction vessel based on the prediction of the second variable;
   wherein the second variable is a bottom butane concentration in the reaction vessel.

2. The method of claim 1, wherein the reaction vessel is a debutanizer.

3. The method of claim 2, wherein the plurality of first variables are selected from the group consisting of a top temperature of the debutanizer, a top pressure of the debutanizer, a reflux flow of the debutanizer, a top product outflow of the debutanizer, a tray temperature of the debutanizer, a bottom temperature of the debutanizer, and combinations thereof.

* * * * *